(12) United States Patent
Hukmani (10) Patent No.: US 11,574,307 B2
(45) Date of Patent: Feb. 7, 2023

(54) THREE PARTY AUTHENTICATION USING QUANTUM KEY DISTRIBUTION

(71) Applicant: Bank of America Corporation, Charlotte, NC (US)

(72) Inventor: Ravi Kiran Hukmani, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 279 days.

(21) Appl. No.: 16/986,701

(22) Filed: Aug. 6, 2020

(65) Prior Publication Data

US 2022/0044240 A1 Feb. 10, 2022

(51) Int. Cl.
*G06Q 20/40* (2012.01)
*H04L 9/08* (2006.01)
*G06Q 20/38* (2012.01)
*B82Y 10/00* (2011.01)

(52) U.S. Cl.
CPC ............ *G06Q 20/401* (2013.01); *B82Y 10/00* (2013.01); *G06Q 20/3829* (2013.01); *H04L 9/0852* (2013.01)

(58) Field of Classification Search
CPC .. G06Q 20/401; G06Q 20/3829; B82Y 10/00; H04L 9/0852
See application file for complete search history.

(56) References Cited

U.S. PATENT DOCUMENTS

| | | | |
|---|---|---|---|
| 5,850,442 A | 12/1998 | Muftic | |
| 5,943,423 A | 8/1999 | Muftic | |
| 6,047,270 A | 4/2000 | Joao et al. | |
| 6,138,907 A | 10/2000 | Mori et al. | |
| 6,157,920 A | 12/2000 | Jakobsson et al. | |
| 6,415,271 B1 | 7/2002 | Turk et al. | |
| 6,446,052 B1 | 9/2002 | Juels | |
| 7,035,411 B2 | 4/2006 | Azuma et al. | |
| 7,133,659 B2 | 11/2006 | Zalewski et al. | |
| 7,155,199 B2 | 12/2006 | Zalewski et al. | |
| 7,774,231 B2 | 8/2010 | Pond et al. | |
| 7,922,075 B2 | 4/2011 | Silverbrook et al. | |
| 7,929,700 B2 | 4/2011 | Lodewyck et al. | |
| 8,006,087 B2 | 8/2011 | Ginter et al. | |
| 8,082,443 B2 | 12/2011 | Troxel et al. | |
| 8,190,553 B2 | 5/2012 | Routt | |
| 8,275,714 B2 | 9/2012 | Eugenio | |
| 8,315,952 B2 | 11/2012 | Algiene | |

(Continued)

FOREIGN PATENT DOCUMENTS

CN 106960343 B * 7/2020 ............. G06Q 20/10

*Primary Examiner* — Bennett M Sigmond
*Assistant Examiner* — Raven E Zeer (57) ABSTRACT

An electronic transaction verification system comprising a client subsystem, a merchant subsystem, and a transaction verification subsystem. The transaction verification subsystem receives a quantum payment serial number from the client subsystem and performs entangled quantum encryption on the received quantum payment serial number to generate an entangled quantum payment serial number. The verification subsystem encrypts the entangled quantum payment serial number and transmits the encrypted entangled quantum payment serial number to the merchant subsystem. The transaction verification subsystem also transmits the entangled quantum payment serial number to the client subsystem.

12 Claims, 4 Drawing Sheets

(56) References Cited

U.S. PATENT DOCUMENTS

| | | |
|---|---|---|
| 8,352,378 B2 | 1/2013 | Al-Herz et al. |
| 8,438,116 B2 | 5/2013 | Al-Herz et al. |
| 8,442,919 B2 | 5/2013 | Al-Herz et al. |
| 8,626,667 B2 | 1/2014 | Walker et al. |
| 8,712,920 B2 | 4/2014 | Walker et al. |
| 8,897,449 B1 | 11/2014 | Broadbent |
| 9,245,260 B2 | 1/2016 | Saito |
| 9,246,602 B2 | 1/2016 | Ukita et al. |
| 9,710,808 B2 | 7/2017 | Slepinin |
| 10,644,882 B2 | 5/2020 | Kurian |
| 2001/0051920 A1 | 12/2001 | Joao et al. |
| 2003/0012385 A1 | 1/2003 | Saito |
| 2003/0144963 A1 | 7/2003 | Saito |
| 2006/0277144 A1 | 12/2006 | Ranzini et al. |
| 2007/0106892 A1 | 5/2007 | Engberg |
| 2007/0168266 A1 | 7/2007 | Questembert |
| 2007/0179883 A1 | 8/2007 | Questembert |
| 2007/0244812 A1 | 10/2007 | Turk et al. |
| 2008/0275820 A1 | 11/2008 | Joao et al. |
| 2009/0041243 A1 | 2/2009 | Nambu |
| 2009/0076904 A1 | 3/2009 | Serena |
| 2009/0094148 A1 | 4/2009 | Gilder |
| 2011/0182428 A1 | 7/2011 | Zhao et al. |
| 2012/0168506 A1 | 7/2012 | Ruehrmair et al. |
| 2014/0379584 A1* | 12/2014 | Ward .................. G06Q 20/3829 705/71 |
| 2015/0262185 A1 | 9/2015 | Abe et al. |
| 2017/0053249 A1 | 2/2017 | Tunnell et al. |
| 2018/0254895 A1* | 9/2018 | Castinado ........... H04W 12/041 |
| 2019/0044713 A1 | 2/2019 | Tomita et al. |
| 2020/0036688 A1 | 1/2020 | Castinado et al. |
| 2020/0153620 A1 | 5/2020 | Howe et al. |
| 2020/0356890 A1* | 11/2020 | Ashrafi ................ H01L 49/006 |
| 2021/0105135 A1* | 4/2021 | Figueroa ............. H04L 9/0858 |
| 2021/0111898 A1* | 4/2021 | McCarty ............ H04L 63/0428 |

* cited by examiner

THREE PARTY AUTHENTICATION USING QUANTUM KEY DISTRIBUTION

TECHNICAL FIELD

The present disclosure relates generally to authentication systems and specifically to three party authentication using quantum key distribution.

BACKGROUND

Securely transferring data and information across a network poses several technical challenges. Networks are susceptible to attacks by unauthorized users trying to gain access to sensitive information being communicated across the network. Unauthorized access to a network may compromise the security of the data and information being communicated across the network.

Furthermore, one or both parties to an electronic transaction may dispute some portion of the transaction. For example, a first party may claim that a second party has not completed the electronic transaction, or the second party may claim that the first party has not fulfilled its end of the transaction. Accordingly, both encryption and authentication are important for electronic transactions.

SUMMARY

Some embodiments described herein use quantum key distribution and entangled quantum state encryption to verify electronic transactions. According to some embodiments, an electronic transaction verification system comprises a client subsystem, a merchant subsystem, and a transaction verification subsystem. The client subsystem performs an electronic transaction with the merchant subsystem, and the transaction verification subsystem provides verification of the electronic transaction.

For example, to initiate the transaction, the client subsystem sends a quantum payment serial number to the transaction verification subsystem. The transaction verification subsystem performs entangled quantum encryption on the received quantum payment serial number to generate an entangled quantum payment serial number, a quantum payment amount code according to the quantum payment serial number, and quantum payment authentication code. The entangled quantum payment serial number, quantum payment amount code, and quantum payment authentication code may be used later by any of the three subsystems to verify the transaction.

To continue the transaction, the verification subsystem encrypts the entangled quantum payment serial number (first copy), quantum payment amount code, and quantum payment authentication code and transmits them to the merchant subsystem along with the verification subsystem signature. The transaction verification subsystem also transmits the entangled quantum payment serial number (second copy) to the client subsystem. The client subsystem generates a quantum payment confirmation code. All three parties now possess the entangled quantum payment serial number.

When the merchant subsystem wants to redeem payment, the merchant subsystem sends a request to the verification subsystem to decrypt and redeem the electronic quantum payment serial identifier and the verification subsystem signature. The request includes the encrypted entangled quantum payment serial identifier, a client signature that the merchant subsystem received from the client subsystem, and a quantum key exchanged between the client subsystem and the merchant subsystem. The verification subsystem reverses the entangled quantum encryption on the entangled quantum payment serial number to obtain the quantum payment serial number and transmits currency associated with the quantum payment serial number to the merchant subsystem.

Should either the client subsystem or merchant subsystem dispute whether the electronic transaction was completed, either subsystem may send a request to the payment verification subsystem. The verification subsystem transmits a verification of the electronic transaction to the client subsystem and/or the merchant subsystem. The verification includes the entangled quantum payment serial number that the client and/or merchant subsystems may use to re-validate the transaction (e.g., the merchant subsystem uses first copy of the entangled quantum payment serial number and the client subsystem uses second copy of the entangled quantum payment serial number).

The embodiments described herein present several technical advantages. In particular embodiments, an electronic transaction includes exchange of quantum keys and quantum entanglement between three parties, such as a client, merchant, and an electronic transaction verification system, to provide a secure dispute resolution mechanism. Particular embodiments include a digital cash payment method that optimizes payment flow, multiplexes authentication techniques and improves the security of electronic commerce. Particular embodiments use quantum payment code generation that is sent to both a client and a merchant in the form of an electronic payment serial number via Greenberger-Horne-Zeilinger (GHZ) particle entangled quantum state encryption technique.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

One example of an electronic transaction is a digital cash system that enables a person to pay for goods or services by transmitting a number from one computer to another. Like the serial numbers on dollar bills, the digital cash numbers are unique. Each one is issued by a financial institution and represents a specified sum of real money. One of the features of digital cash is that, like real cash, it is anonymous and reusable. Digital cash involves three types of users: a client, a merchant, and a financial institution, such as a bank with whom both the client and merchant have accounts. An example is illustrated in FIG. 1.

Figure 1:
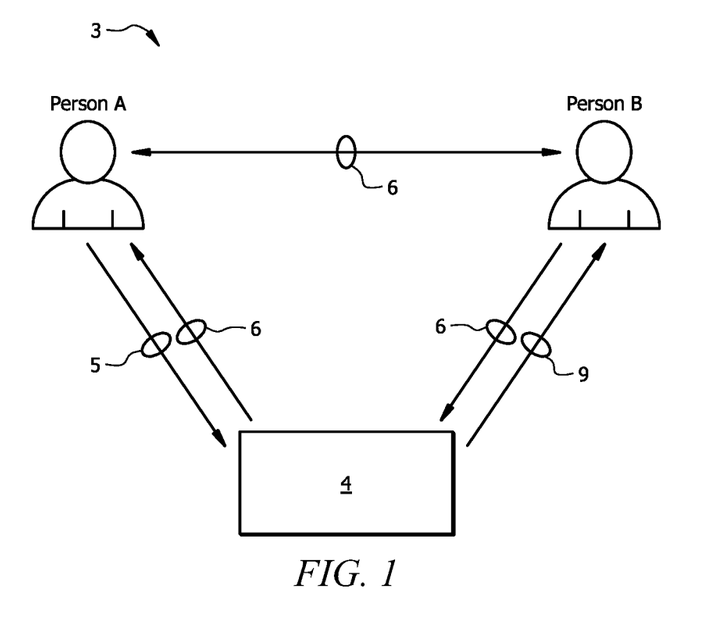
FIG. 1 is a block diagram illustrating an example of an electronic transaction.

FIG. 1 is a block diagram illustrating an example of electronic transaction 3. Electronic transaction 3 may comprise a digital cash transaction between person A and person B. At some time prior to the electronic transaction, Person A makes request 5 for digital cash from institution 4. Institution 4 issues digital cash 6 to person A. When Person A wants to conduct the electronic transaction with Person B, Person A sends digital cash 6 to Person B. To redeem payment, Person B sends digital cash 6 to institution 4 requesting payment. Institution 4 sends payment 9 to Person B.

There currently exist problems with digital cash in terms of security and payment flow. For example, security authentication techniques threaten the security of ecommerce. In the example illustrated in FIG. 1, the digital cash may be encrypted when transmitted between institution 4, Person A, and Person B. The encryption may prevent an unauthorized third party from obtaining the digital cash. The encryption technology, however, cannot provide dispute resolution.

For example, a client may claim that it paid, and a merchant may claim that funds were not received. As another example, a client may receive goods or services, but the merchant may not receive payment. The encryption technology described above cannot provide resolution to these problems.

Certain aspects of the present disclosure and their embodiments may provide solutions to these or other challenges. Particular embodiments are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

Particular embodiments provide technological improvements to the encryption technology described above. Some embodiments described herein use quantum key distribution and entangled quantum state encryption to verify (e.g., provide dispute resolution) electronic transactions.

As described herein, an electronic transaction includes three parties, a client or customer, a merchant, and a verification party, such as a financial institution. A client may have digital cash that it wants to send to a merchant. Instead of sending the digital cash directly to the merchant as illustrated in FIG. 1, the client may send the digital cash to a third party for verification.

The third party, such as financial institution, may use encryption techniques, such as quantum key distribution and entangled quantum state encryption, to create a three-way entangled representation of the digital cash that may be distributed to both the client and the merchant. The merchant may then use the three-way entangled representation of the digital cash to request payment from the verification party.

Should a dispute arise, the client, the merchant or both may submit its copy of the three-way entangled representation of the digital cash to the verification party. The verification party uses the three-way entangled representation of the digital cash to confirm the transaction. An example is illustrated in FIG. 2.

Figure 2:
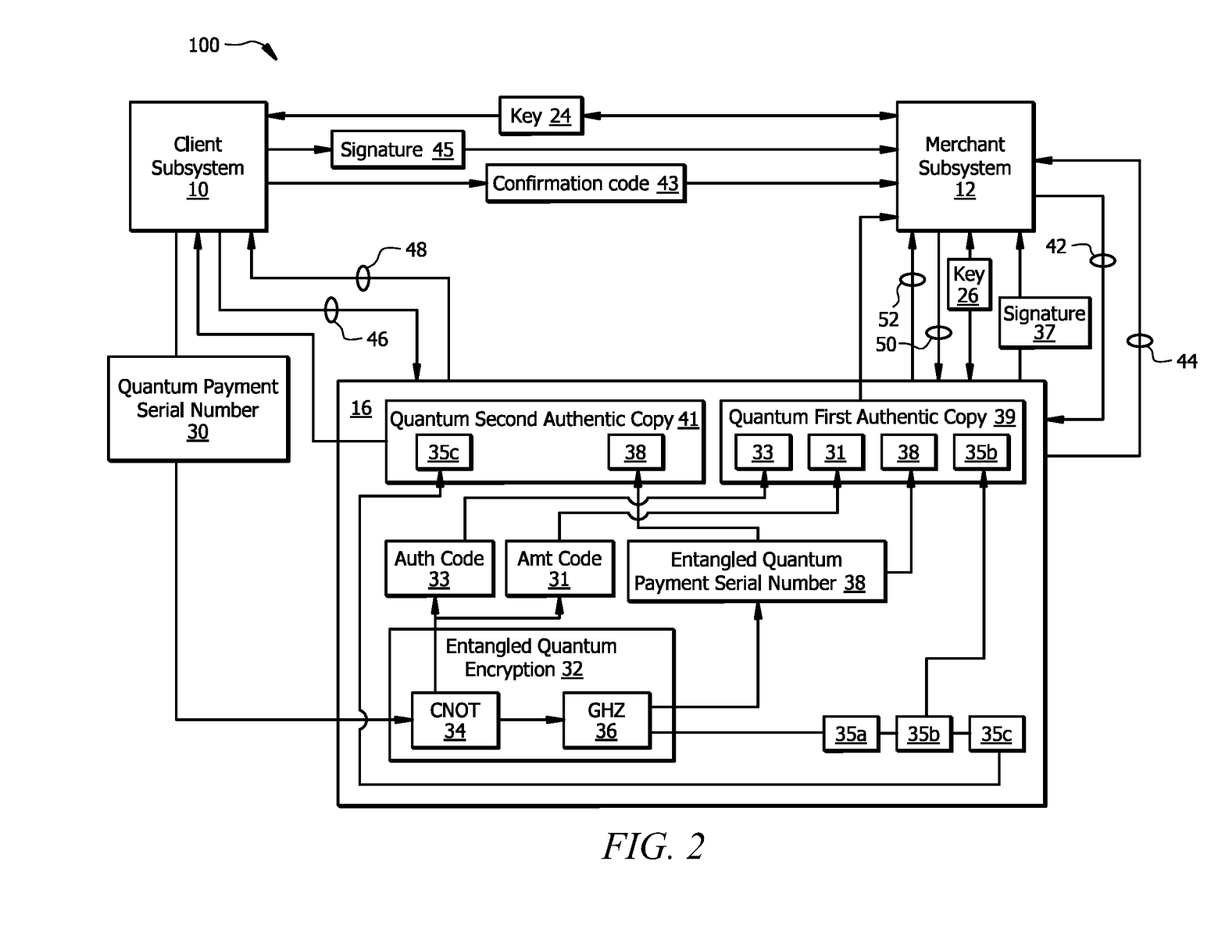
FIG. 2 is a flow diagram illustrating an embodiment of an electronic transaction verification system.

FIG. 2 is a flow diagram illustrating an embodiment of an electronic transaction verification system 100. Electronic transaction verification system 100 includes client subsystem 10, merchant subsystem 12, and verification subsystem 16. Verification subsystem 16 may be operated by a trusted institution, such as a bank.

Client subsystem 10 comprises any device used by a client for performing an electronic transaction. For example, the client may be an individual person using a smartphone, laptop, or other computing device to perform an electronic transaction. In some embodiments, the client may comprise an organization or institution and the device may comprise one or more computer systems.

Merchant subsystem 12 comprises any device used by a merchant for performing an electronic transaction. For example, the merchant may be an online retailer and the device may comprise a point of sale system, a server, or any other computer device to perform an electronic transaction.

Although the terms client and merchant are used in the examples described herein, in particular embodiments either client and/or merchant may refer to an individual or an entity. For example, the electronic transaction may take place between two individuals, between two businesses, or any suitable combination of entities.

An electronic transaction may comprise an exchange of digital cash between client subsystem 10 and merchant subsystem 12. As described above, digital cash is not exchanged directly between client subsystem 10 and merchant subsystem 12. Instead, the transaction includes verification subsystem 16 that acts as a trusted third party to verify the transaction.

Verification subsystem 16 uses quantum encryption to verify electronic transactions. Thus, as an initial matter, the parties may exchange quantum keys.

Client subsystem 10 may exchange key 24 with merchant subsystem 12. Key 24 may comprise a quantum key shared between client subsystem 10 and merchant subsystem 12. Key 24 may be used to encrypt/decrypt communications between client subsystem 10 and merchant subsystem 12.

Merchant subsystem 12 may exchange key 26 with verification subsystem 16. Key 26 may comprise a quantum key shared between merchant subsystem 12 and verification subsystem 16. Key 26 may be used to encrypt/decrypt communications between merchant subsystem 12 and verification subsystem 16.

To initiate the electronic transaction, client subsystem 10 prepares digital cash to be verified by verification subsystem 16. For example, client subsystem 10 may include a digital wallet with digital cash serial numbers. Client subsystem may select a particular digital cash serial number and prepare quantum payment serial number 30.

Quantum payment serial number 30 may comprise a payment serial number encrypted using quantum one-time pad (OTP) encryption (e.g., using key 24). For example, quantum payment serial number 30 may comprise one or more qubits.

Client subsystem 10 sends quantum payment serial number 30 to verification subsystem 16. Verification subsystem 16 receives quantum payment serial number 30 and uses quantum entanglement to create an encrypted serial number that will be known to all three parties and can later be used to verify the electronic transaction.

For example, entangled quantum encryption module 32 receives quantum payment serial number 30 and generates entangled quantum payment serial number 38.

In some embodiments, entangled quantum encryption module 32 includes CNOT module 34 and GHZ module 36. CNOT module 34 comprises a quantum controlled-NOT gate. A CNOT gate is a quantum logic gate that may be used to entangle and disentangle quantum particle states. The CNOT gate operates on a quantum register consisting of 2 qubits. The CNOT gate flips the second qubit (the target qubit) if and only if the first qubit (the control qubit) is 1.

CNOT module 34 receives quantum payment serial number 30 and transforms the qubits according to the CNOT logic. The CNOT logic is used to verify a quantum payment amount code 31 associated with quantum payment serial number 30 and generate quantum payment authentication code 33 and verification subsystem signature 37. CNOT module 34 sends the CNOT transformed qubits of quantum payment serial number 30 to GHZ module 36.

A Greenberger-Horne-Zeilinger state (GHZ state) is a type of entangled quantum state that involves at least three subsystems. The GHZ state is a maximally entangled quantum state. GHZ module 36 receives the CNOT transformed qubits of quantum payment serial number 30 and prepares GHZ 3 entangled quantum state particle pairs 35a, 35b, and 35c and entangled quantum payment serial number 38.

Entangled quantum payment serial number 38 is entangled by the three GHZ particle pairs 35a, 35b, and 35c. Particle pair 35b will be sent to merchant subsystem 12, particle pair 35c will be sent to client subsystem 10, and verification subsystem 16 preserves particle pair 35a. Verification subsystem 16 uses entangled quantum payment serial number 38 to create quantum first authentic copy 39. Quantum first authentic copy 39 includes entangled quantum payment serial number 38 associated with particle pair 35b, quantum payment amount code 31, and quantum payment authentication code 33.

Verification subsystem 16 transmits quantum first authentic copy 39 and verification subsystem signature 37 to merchant subsystem 12. In some embodiments, verification subsystem 16 encrypts quantum first authentic copy 39 before transmitting it to merchant subsystem 12. For example, verification subsystem 16 may use key 26 to encrypt quantum first authentic copy 39 and may transmit encrypted quantum first authentic copy 39 to merchant subsystem 12.

Verification subsystem 16 also uses entangled quantum payment serial number 38 to create a quantum second authentic copy 41. Quantum second authentic copy 41 includes entangled quantum payment serial number 38 associated with particle pair 35c. Verification subsystem 16 transmits quantum second authentic copy 41 to client subsystem 10.

Client subsystem 10 receives quantum second authentic copy 41 and combines particle pair 35c with entangled quantum payment serial number 38 to perform joint measurement and generate quantum payment confirmation code 43 and client subsystem signature 45. For example, client subsystem 10 may perform multiple Bell state joint measurements, where each Bell state joint measurement generates four Bell state particles. Quantum payment confirmation code 43 may be expressed in the form of the generated set of the four Bell state particles.

At this point, client subsystem 10 has initiated the electronic transaction by sending quantum payment serial number 30 to verification subsystem 16 and verification subsystem has generated and distributed entangled quantum payment serial number 38 to all parties. Merchant subsystem 12 has quantum first authentic copy 39, and client subsystem 10 has quantum second authentic copy 41.

Client subsystem 10 may continue the transaction by transmitting quantum payment confirmation code 43 and client subsystem signature 45 to merchant subsystem 12. In some embodiments, client subsystem 10 may encrypt quantum payment confirmation code 43 using key 24 and transmit encrypted quantum payment confirmation code 43 to merchant subsystem 12.

At this point, merchant subsystem 12 has all the information necessary to complete the transaction (i.e., quantum first authentic copy 39 from verification subsystem 16 and quantum payment confirmation code 43 from client subsystem 10). Merchant subsystem 12 may complete the electronic transaction by requesting payment from verification subsystem 16.

As a first step, if merchant subsystem 12 received encrypted quantum first authentic copy 39, then merchant subsystem 12 uses key 26 to decrypt quantum first authentic copy 39. Similarly, if merchant subsystem 12 received encrypted quantum payment confirmation code 43, then merchant subsystem 12 may use key 24 to decrypt quantum payment confirmation code 43.

Merchant subsystem 12 may transmit request 42 to decrypt and redeem the quantum payment serial identifier to verification subsystem 16. Request 42 includes entangled quantum payment serial number 38 associated with particle pairs 35b and 35c, quantum payment amount code 31, quantum payment authentication code 33, key 24, and signature 45.

Verification subsystem 16 uses key 24 to decrypt client subsystem signature 45 and quantum payment authentication code 33. Client subsystem signature 45 may also be used to generate quantum payment confirmation code 43 that merchant subsystem 12 received from client subsystem 10.

Verification subsystem 16 reverses operation i.e. performs the cash recovery operation on quantum payment authentication code 33 according to the quantum payment serial number 30 and quantum payment confirmation code 43 to generate a reinstated copy of the digital cash. If the reinstated copy of the digital cash matches a first copy of the digital cash, then verification subsystem 16 verifies that the client has paid the correct amount of electronic cash and transmits currency 44 associated with quantum payment serial number 30 to merchant subsystem 12.

At this point merchant subsystem 12 has received payment and the electronic transaction is complete. In some scenarios, however, the electronic transaction may not complete successfully.

For example, the merchant may claim that goods were shipped, but payment was never received. If client subsystem 10 is able to provide entangled quantum payment serial number 38 to verification subsystem 16, then client subsystem 10 is able to prove that it paid, and the merchant may track down the problem on its side. If client subsystem 10 is not able to provide entangled quantum payment serial number 38, then the merchant may demand payment. In another example, the merchant may claim it was paid, but not paid the correct amount. Or the client may have sent payment but not received the goods. A particular advantage of some embodiments is that these disputes may be resolved based on the entangled quantum payment serial number.

In some embodiments client subsystem 10 may transmit request 46 to verify whether merchant subsystem 12 performed an electronic transaction. Request 46 may include entangled quantum payment serial number 38. In response, verification subsystem 16 may transmit verification 48 to client subsystem 10. Verification 48 may include quantum second authentic copy 41. Client subsystem 10 may perform re-validation on quantum second authentic copy 41 to determine whether the transaction is correct.

In some embodiments merchant subsystem 12 may transmit request 50 to verify whether client subsystem 10 performed an electronic transaction. Request 50 may include entangled quantum payment serial number 38. In response, verification subsystem 16 may transmit verification 52 to merchant subsystem 12. Verification 52 may include quantum first authentic copy 39. Merchant subsystem 12 may perform re-validation on quantum first authentic copy 39 to determine whether the transaction is correct.

Figure 3:
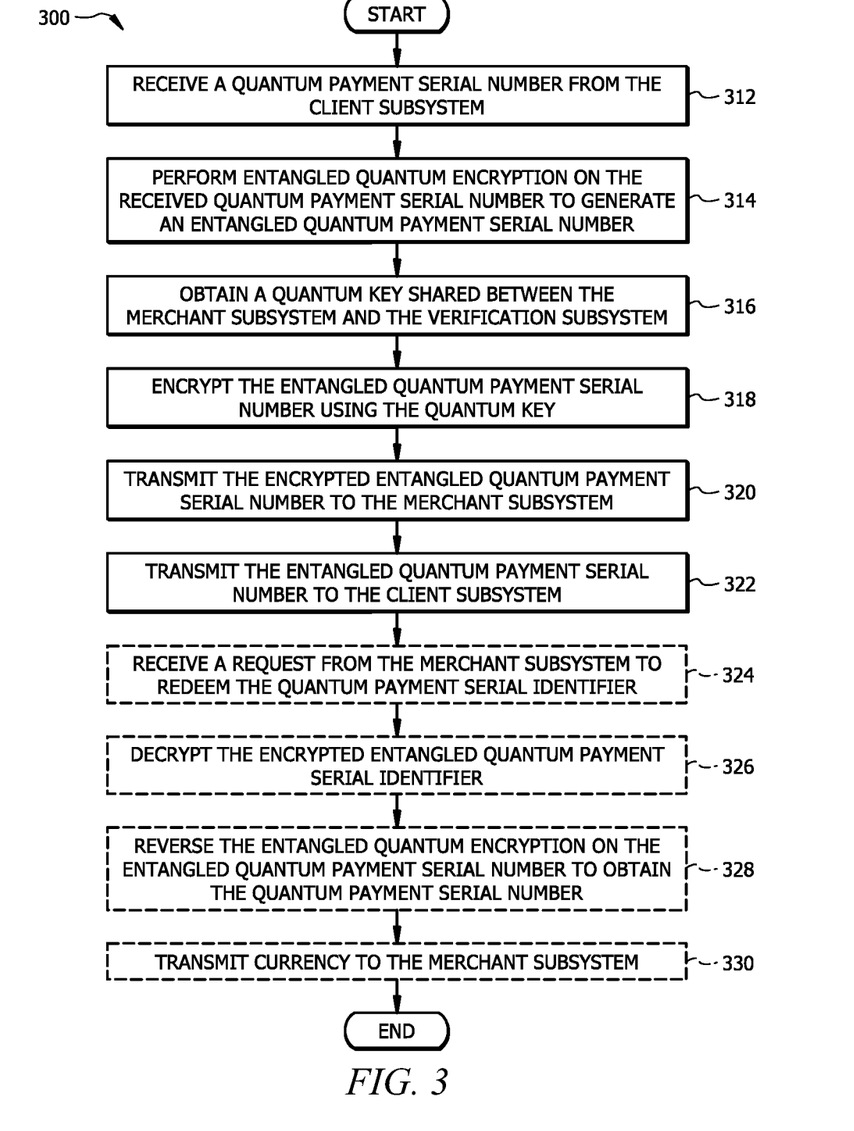
FIG. 3 is a flow diagram illustrating an example method in a verification subsystem for performing an electronic transaction.

While FIG. 2 illustrates the overall electronic transaction authentication system, FIG. 3 illustrates an example from the point of view of the verification subsystem, such as verification subsystem 16 described with respect to FIG. 2.

FIG. 3 is a flow diagram illustrating an example method in a verification subsystem for performing an electronic transaction. Method 300 may be performed by verification subsystem 16 described above.

The method begins at step 312, where the client subsystem 10 initiates the electronic transaction. In this step, verification subsystem 16 receives quantum payment serial number 30 from client subsystem 10.

In some embodiments, quantum payment serial number 30 may comprise a payment serial number encrypted using quantum one-time pad (OTP) encryption. For example, quantum payment serial number 30 may comprise one or more qubits.

At step 314, verification subsystem 16 performs entangled quantum encryption on received quantum payment serial number 30 to generate entangled quantum payment serial number 38.

In particular embodiments, received quantum payment serial number 30 comprises one or more qubits. The entangled quantum encryption comprises transforming a quantum state of the received one or more qubits using a quantum controlled-NOT gate (e.g., CNOT 34 in FIG. 2). The output of the quantum controlled-NOT gate is used to generate a Greenberger-Horne-Zeilinger (GHZ) 3 entangled state particle pair (e.g., see GHZ 36 and particle pairs 35a, 35b, and 35c in FIG. 2) that comprises entangled quantum payment serial number 38.

In some embodiments, the CNOT logic is used to verify a quantum payment amount code 31 associated with quantum payment serial number 30 and generate quantum payment authentication code 33 and verification subsystem signature 37.

Entangled quantum payment serial number 38 is distributed to both merchant subsystem 12 and client subsystem 10. In some embodiments, entangled quantum payment serial number 38 is distributed as a quantum first authentic copy (e.g., quantum first authentic copy 39 described with respect to FIG. 2) to merchant subsystem 12, or is distributed as a quantum second authentic copy (e.g., quantum second authentic copy 41 described with respect to FIG. 2) to client subsystem 10.

In preparation for transmission to merchant subsystem 12, at step 316 verification subsystem 16 obtains a quantum key (e.g., key 26 in FIG. 2) shared between merchant subsystem 12 and verification subsystem 16. Obtaining the quantum key is illustrated at step 316 for clarity of discussion, but in particular embodiments key exchange between verification subsystem 16 and merchant subsystem 12 may happen at any suitable time leading up to step 318.

At step 318, verification subsystem 16 encrypts entangled quantum payment serial number 38 using the quantum key (e.g., key 26) shared between merchant subsystem 12 and verification subsystem 16 resulting in encrypted entangled quantum payment serial number 40. In some embodiments, verification subsystem 16 encrypts quantum first authentic copy 39.

At step 320, verification subsystem 16 transmits encrypted entangled quantum payment serial number 40 to merchant subsystem 12. To complete the tripartite verification system, verification subsystem 16 transmits entangled quantum payment serial number 38 to client subsystem 10 at step 322. In some embodiments, verification subsystem 16 transmits quantum second authentic copy 41.

At this point in the method, merchant subsystem 12 may complete the electronic transaction by requesting payment from verification subsystem 16. At step 324, verification subsystem 16 may receive request 42 from merchant subsystem 12 to redeem the quantum payment serial identifier. The request comprises encrypted entangled quantum payment serial identifier 40, a client subsystem signature 45 that the merchant subsystem received from the client subsystem, and key 24 that the merchant subsystem exchanged with the client subsystem. In some embodiments, request 42 includes quantum payment amount code 31 and quantum payment authentication code 33.

At step 326, verification subsystem 16 decrypts encrypted entangled quantum payment serial identifier 40 using the quantum key (e.g., key 26) shared between merchant subsystem 12 and verification subsystem 16.

At step 328, verification subsystem 16 reverses the entangled quantum encryption on entangled quantum payment serial number 38 to verify quantum payment serial number 30.

In some embodiments, verification subsystem 16 uses key 24 to decrypt client subsystem signature 45 and quantum payment authentication code 33. Client subsystem signature 45 may also be used to generate quantum payment confirmation code 43 that merchant subsystem 12 received from client subsystem 10.

Verification subsystem 16 reverses operation i.e. performs the cash recovery operation on quantum payment authentication code 33 according to the quantum payment serial number 30 and quantum payment confirmation code 43 to generate a reinstated copy of the digital cash. If the reinstated copy of the digital cash matches a first copy of the digital cash, then verification subsystem 16 verifies that the client has paid the correct amount of electronic cash.

At step 330, verification subsystem 16 transmits currency associated with quantum payment serial number 30 to merchant subsystem 12. At this point, merchant subsystem 12 has received payment and the electronic transaction is complete.

Modifications, additions, or omissions may be made to the method of FIG. 3. Additionally, one or more steps in method 300 of FIG. 3 may be performed in parallel or in any suitable order. For example, in some embodiments step 316 may be performed earlier in the method.

After the transaction is complete one or both parties may dispute some aspect of the transaction, as described above. A general method for resolving disputes is illustrated in FIG. 4.

Figure 4:
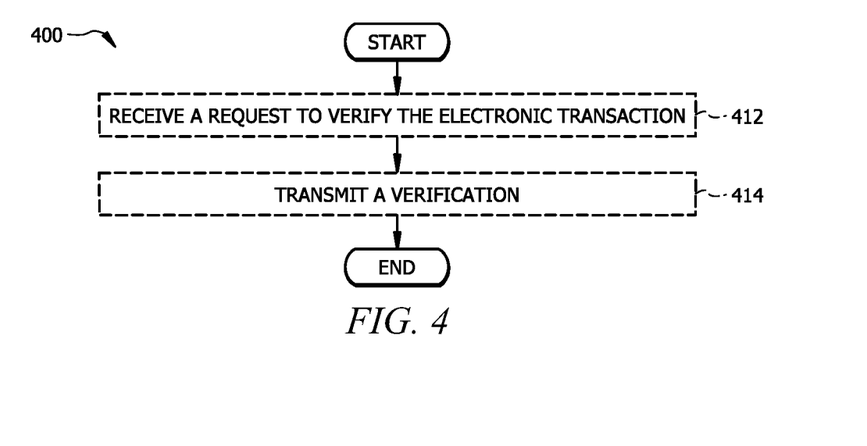
FIG. 4 is a flow diagram illustrating an example method in a verification subsystem for verifying an electronic transaction.

FIG. 4 is a flow diagram illustrating an example method in an verification subsystem for verifying an electronic transaction. Method 400 may be performed by verification subsystem 16 described above.

The method begins at step 412, where verification subsystem 16 receives request 46 from client subsystem 10 and/or request 50 from merchant subsystem 12 to verify whether client subsystem 10 and/or merchant subsystem 12 performed an electronic transaction.

At step 414, verification subsystem 16 transmits a verification 48, 52 of the electronic transaction to client subsystem 10 and/or merchant subsystem 12. The verification includes entangled quantum payment serial number 38 that the merchant subsystem uses to re-validate the electronic transaction. For example, verification subsystem 16 may transmit quantum first authentic copy 39 to merchant subsystem 12. Merchant subsystem 12 may perform re-validation on quantum first authentic copy 39 to determine whether the transaction is correct. Similarly, verification subsystem 16 may transmit quantum second authentic copy 41 to client subsystem 10. Client subsystem 10 may perform re-validation on quantum second authentic copy 41 to determine whether the transaction is correct.

Modifications, additions, or omissions may be made to the method of FIG. 4. Additionally, one or more steps in method 400 of FIG. 4 may be performed in parallel or in any suitable order.

Figure 5:
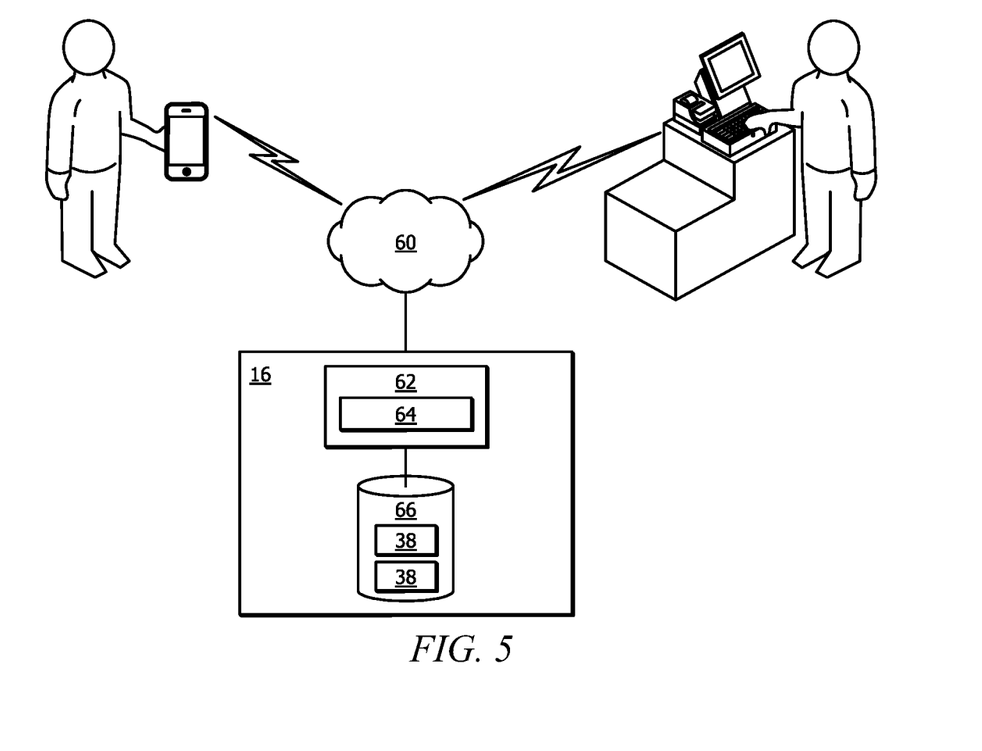
FIG. 5 is a block diagram illustrating an electronic transaction verification system, according to particular embodiments.

FIG. 5 is a block diagram illustrating an electronic transaction verification system, according to particular embodiments. Client subsystem 10 and merchant subsystem 12 are coupled to verification subsystem 16 via network 60.

Verification subsystem 16 comprises memory 66 operable to store entangled quantum payment serial numbers 38 and instructions 64, and one or more processors 62 coupled to memory 66. One or more processors 66 may be implemented as one or more central processing unit (CPU) chips, logic units, cores (e.g., a multi-core processor), field-programmable gate array (FPGAs), application specific integrated circuits (ASICs), or digital signal processors (DSPs). The one or more processors are configured to implement various instructions 64 to process an electronic transaction and may be implemented in hardware and/or software. Processor 62 is communicably coupled to memory 66.

Memory 66 comprises one or more disks, tape drives, or solid-state drives, and may be used as an over-flow data storage device, to store programs when such programs are selected for execution, and to store instructions and data that are read during program execution, such as instructions and logic rules. Memory 66 may be volatile or non-volatile and may comprise read only memory (ROM), random access memory (RAM), ternary content-addressable memory (TCAM), dynamic RAM (DRAM), and/or static RAM (SRAM). Memory 66 may comprise cloud storage. Memory 66 is operable to store, for example, entangled quantum payment serial numbers 38.

Network 60 comprises a plurality of network nodes configured to communicate data between one or more of client subsystem 10, merchant subsystem 12, and verification subsystem 16. Examples of network nodes include, but are not limited to, routers, switches, modems, web clients, and web servers. Network 60 comprises any suitable type of wireless and/or wired network including, but not limited to, all or a portion of the Internet, the public switched telephone network, a cellular network, and/or a satellite network. Network 60 is configured to support any suitable communication protocols as would be appreciated by one of ordinary skill in the art upon viewing this disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. An electronic transaction verification system comprising:
a client subsystem, a merchant subsystem, and a transaction verification subsystem coupled to a network;
the transaction verification subsystem comprising a memory and one or more processors coupled to the memory, the one or more processors operable to:
receive a quantum payment serial number from the client subsystem over the network;
perform entangled quantum encryption on the received quantum payment serial number to generate an entangled quantum payment serial number;
obtain a quantum key shared between the merchant subsystem and the verification subsystem;
encrypt the entangled quantum payment serial number using the quantum key shared between the merchant subsystem and the verification subsystem;
transmit the encrypted entangled quantum payment serial number to the merchant subsystem over the network;
transmit the entangled quantum payment serial number to the client subsystem over the network;
receive, through the network from the merchant subsystem, a request to redeem the quantum payment serial identifier, the request comprising the encrypted entangled quantum payment serial identifier and a client signature that the merchant subsystem received from the client subsystem;
decrypt the encrypted entangled quantum payment serial identifier using the quantum key shared between the merchant subsystem and the verification subsystem;
reverse the entangled quantum encryption on the entangled quantum payment serial number to obtain the quantum payment serial number; and
transmit currency associated with the quantum payment serial number to the merchant subsystem.

2. The electronic transaction verification system of claim 1, wherein the received quantum payment serial number comprises one or more qubits; and wherein
performing the entangled quantum encryption comprises:
transforming a quantum state of the received one or more qubits using a quantum controlled-NOT gate to verify a quantum payment amount code associated with the quantum payment serial number and generate a payment authentication code;
based on the output of the quantum controlled-NOT gate, generating a Greenberger-Horne-Zeilinger (GHZ) 3 entangled state particle pair that comprises the entangled quantum payment serial number; and
the one or more processors are operable to transmit the encrypted entangled quantum payment serial number to the merchant subsystem by transmitting the encrypted entangled quantum payment serial number, the quantum payment amount code, and the payment authentication code.

3. The electronic transaction verification system of claim 1, the one or more processors of the verification subsystem further operable to:
receive a request from the merchant subsystem to verify whether the client subsystem performed an electronic transaction; and
transmit a verification of the electronic transaction to the merchant subsystem, wherein the verification includes the entangled quantum payment serial number that the merchant subsystem uses to re-validate the electronic transaction.

4. The electronic transaction verification system of claim 1, the one or more processors of the verification subsystem further operable to:
receive a request from the client subsystem to verify whether the merchant subsystem performed an electronic transaction, the request to verify comprising an entangled quantum payment serial number;
transmit a verification of the electronic transaction to the client subsystem, wherein the verification includes the entangled quantum payment serial number that the client subsystem uses to re-validate the electronic transaction.

5. A method for use in an electronic transaction verification system, wherein an electronic transaction is between a client subsystem and a merchant subsystem, the method comprising:
receiving a quantum payment serial number from the client subsystem;
performing entangled quantum encryption on the received quantum payment serial number to generate an entangled quantum payment serial number;
obtaining a quantum key shared between the merchant subsystem and the verification subsystem;
encrypting the entangled quantum payment serial number using the quantum key shared between the merchant subsystem and the verification subsystem;
transmitting the encrypted entangled quantum payment serial number to the merchant subsystem;
transmitting the entangled quantum payment serial number to the client subsystem;
receiving a request from the merchant subsystem to redeem the quantum payment serial identifier, the request comprising the encrypted entangled quantum payment serial identifier and a client signature that the merchant subsystem received from the client subsystem;
decrypting the encrypted entangled quantum payment serial identifier using the quantum key shared between the merchant subsystem and the verification subsystem;
reversing the entangled quantum encryption on the entangled quantum payment serial number to obtain the quantum payment serial number; and
transmitting currency associated with the quantum payment serial number to the merchant subsystem.

6. The method of claim 5, wherein the received quantum payment serial number comprises one or more qubits, and performing the entangled quantum encryption comprises:
transforming a quantum state of the received one or more qubits using a quantum controlled-NOT gate to verify a quantum payment amount code associated with the quantum payment serial number and generate a payment authentication code; and
based on the output of the quantum controlled-NOT gate, generating a Greenberger-Horne-Zeilinger (GHZ) 3 entangled state particle pair that comprises the entangled quantum payment serial number; and
transmitting the encrypted entangled quantum payment serial number to the merchant subsystem comprises transmitting the encrypted entangled quantum payment serial number, the quantum payment amount code, and the payment authentication code.

7. The method of claim 5, further comprising:
receiving a request from the merchant subsystem to verify whether the client subsystem performed an electronic transaction; and
transmitting a verification of the electronic transaction to the merchant subsystem, wherein the verification includes the entangled quantum payment serial number that the merchant subsystem uses to re-validate the electronic transaction.

8. The method of claim 5, further comprising:
receiving a request from the client subsystem to verify whether the merchant subsystem performed an electronic transaction; and
transmitting a verification of the electronic transaction to the client subsystem, wherein the verification includes the entangled quantum payment serial number that the client subsystem uses to re-validate the electronic transaction.

9. A transaction verification subsystem comprising a memory and one or more processors coupled to the memory, the one or more processors operable to:
receive a quantum payment serial number from a client subsystem;
perform entangled quantum encryption on the received quantum payment serial number to generate an entangled quantum payment serial number;
obtain a quantum key shared between a merchant subsystem and the verification subsystem;
encrypt the entangled quantum payment serial number using the quantum key shared between the merchant subsystem and the verification subsystem;
transmit the encrypted entangled quantum payment serial number to the merchant subsystem over the network;
transmit the entangled quantum payment serial number to the client subsystem over the network;
receive, from the merchant subsystem, a request to redeem the quantum payment serial identifier, the request comprising the encrypted entangled quantum payment serial identifier and a client signature that the merchant subsystem received from the client subsystem;
decrypt the encrypted entangled quantum payment serial identifier using the quantum key shared between the merchant subsystem and the verification subsystem;
reverse the entangled quantum encryption on the entangled quantum payment serial number to obtain the quantum payment serial number; and
transmit currency associated with the quantum payment serial number to the merchant subsystem.

10. The transaction verification subsystem of claim 9, wherein the received quantum payment serial number comprises one or more qubits and wherein
performing the entangled quantum encryption comprises:
transforming a quantum state of the received one or more qubits using a quantum controlled-NOT gate to verify a quantum payment amount code associated with the quantum payment serial number and generate a payment authentication code;
based on the output of the quantum controlled-NOT gate, generating a Greenberger-Horne-Zeilinger (GHZ) 3 entangled state particle pair that comprises the entangled quantum payment serial number; and
the one or more processors are operable to transmit the encrypted entangled quantum payment serial number to the merchant subsystem by transmitting the encrypted entangled quantum payment serial number, the quantum payment amount code, and the payment authentication code.

11. The transaction verification subsystem of claim 9, the one or more processors further operable to:

receive a request from the merchant subsystem to verify whether the client subsystem performed an electronic transaction; and transmit a verification of the electronic transaction to the merchant subsystem, wherein the verification includes the entangled quantum payment serial number that the merchant subsystem uses to re-validate the electronic transaction.

12. The transaction verification subsystem of claim 9, the one or more processors further operable to:

receive a request from the client subsystem to verify whether the merchant subsystem performed an electronic transaction; and transmit a verification of the electronic transaction to the client subsystem, wherein the verification includes the entangled quantum payment serial number that the client subsystem uses to re-validate the electronic transaction.

\* \* \* \* \*